United States Patent [19]

Velten

[11] Patent Number: 4,569,327
[45] Date of Patent: Feb. 11, 1986

[54] COLLAPSIBLE FOLDING BARBECUE UNIT

[76] Inventor: S. Dean Velten, P.O. Box 4698, Brownsville, Tex. 78520

[21] Appl. No.: 685,719

[22] Filed: Dec. 24, 1984

[51] Int. Cl.$^4$ ............................................. A47J 37/00
[52] U.S. Cl. .............................. 126/25 A; 126/25 R; 126/9 B; 126/9 R
[58] Field of Search ...................... 126/9 B, 9 R, 25 R, 126/25 A, 29, 38; 99/449, 394, 393, 402, 400; 219/385, 386

[56] References Cited

U.S. PATENT DOCUMENTS

| | | | |
|---|---|---|---|
| 3,119,387 | 1/1964 | Beller | 126/25 A |
| 3,490,433 | 1/1970 | Busenbarrick | 126/25 R X |
| 4,240,398 | 12/1980 | Lindop | 126/25 R |
| 4,457,290 | 7/1984 | Edwards | 126/25 R X |
| 4,524,751 | 6/1985 | Hoglund | 126/9 B X |
| 4,526,158 | 7/1985 | Lee | 126/9 R |

OTHER PUBLICATIONS

European Patent Application (PCT) 0,039,194, Publ. 11/4/81, Hoglund.

*Primary Examiner*—Randall L. Green
*Attorney, Agent, or Firm*—Gunn, Lee & Jackson

[57] ABSTRACT

A collapsible, folding barbecue cooking unit is provided having a generally rectangular base formed by a base plate with upstanding side and rear wall portions. A pair of side plates and a back plate are hingedly connected to the upstanding side and back wall portions and are positionable in upright interlocked relation during use. A pair of horizontal grill elements of slightly smaller dimension than that of the base plate are capable of being supported within the cooking unit by opposed handle elements that are selectively engageable with grill positioning slots formed in the side plates. For storage, the grill elements are positionable within a rectangular grill storage receptacle defined by the base plate and the upstanding wall portions thereof with the handle portions of both of the grill elements being exposed outwardly of the unit. The side wall and rear wall portions are then foldable to overlapping relation against the uppermost grill element within the grill storage enclosure. In its resulting folded configuration, the barbecue unit defines a compact structure, the thickness dimension of which is substantially restricted to the combined thickness dimensions of the base plate, the overlapping side and rear wall structures and the grill elements.

16 Claims, 5 Drawing Figures

COLLAPSIBLE FOLDING BARBECUE UNIT

FIELD OF THE INVENTION

This invention relates generally to a barbecue cooking mechanism for typical use in outdoor cooking, such as during outdoor recreational activities and general outdoor cooking. More specifically, the present invention is directed to a foldable barbecue grill unit which, for purposes of storage, transportation and handling, is capable of being folded to a thin, rectangular configuration with exposed handles for carrying.

BACKGROUND OF THE INVENTION

Various types of outdoor cooking stoves or grills have been extensively used in the past for cooking various food products, particularly meat, in an outdoor environment. Users of such devices particularly enjoy the taste that is imparted to the food products by cooking over charcoal, wood or the like, wherein the food product is flavored with smoke during the cooking process.

In many cases, outdoor barbecue devices require a significant amount of space for storage and handling, due to the size and dimension of such parts as the firebox, grill elements, barbecue supports, etc. In outdoor activities, such as camping, it is frequently desirable to transport an outdoor barbecue device in order that outdoor barbecuing can be accomplished in conjunction with camping activities. In such cases, the barbecue cooking devices that are commercially available at this time typically require an unusually large amount of space for transportation and handling, thereby rendering them generally ineffective for such outdoor activities. It is desirable, therefore, to provide an outdoor barbecue unit which is of a size promoting efficient use thereof during outdoor activities and yet is capable of being folded to an extremely compact unit which is efficient for storage and handling in conjunction with outdoor activities. It is also desirable to provide an outdoor barbecue unit that is designed to be set up for use or folded for storage in only a few minutes time and without any risk getting hands or clothing soiled in doing so.

It is also well known that the grill portions of typical barbecue units for support of food products being cooked and support of cooking fuel, such as charcoal briquets, charcoal, wood, etc., typically become quite dirty during outdoor cooking activities. Moreover, in the outdoor environment, it is usually difficult, if not impractical, to accomplish cleaning of the grills so that they can be handled and transported without soiling other equipment. It is therefore desirable to provide a portable barbecue assembly that may be efficiently handled and transported after use without necessitating cleaning of the grills and without the risk of soiling other equipment.

THE PRIOR ART

Over the years, many different types of portable cooking devices have been developed particularly for use in the outdoor environment. For example, U.S. Pat. No. 34,791 of Stevens, et al. discloses a portable furnace capable of being folded to a rather flat condition, as shown particularly in FIG. 4. U.S. Pat. No. 1,466,343 of Rouse discloses a camp stove construction which is capable of being folded. U.S. Pat. No. 1,487,737 shows a camp stove having three foldable sides and a grill that can be adjustably placed with respect to the flame. Various other collapsible stove constructions are disclosed by U.S. Pat. Nos. 2,076,783 of Jones; 2,424,665 of Pope; 3,285,238 of Norlie; and 4,106,473 of Wandel. U.S. Pat. No. 3,667,446 of Morton discloses a portable and collapsible charcoal grill having a base member and collapsible side members with movable shelf means. The foldable or collapsible portions fit within a portion of the device as a receptacle. Collapsible barbecue cooking devices having handle structures for carrying of the same are disclosed by U.S. Pat. Nos. 3,297,017 of Levin and 3,490,433 of Busenbarrick.

SUMMARY OF THE INVENTION

A generally rectangular base structure formed of sheet metal is provided, having upturned side and rear wall flange portions forming part of the side and rear walls of the collapsible folding barbecue unit. The rear or back flange is of less height as compared to the height of the side flange. A pair of side plates and a rear plate are hingedly connected to the upstanding side and rear portions of the base plate and, during use, are positioned in upright manner and interlocked by means of pivotal lock devices. The side plates are formed to define parallel, generally vertical grill positioning slots with intersecting transverse handle slots which receive the handle portions of a pair of grill elements in such manner as to adjust the position of the food being cooked relative to the heat or flame provided by the fuel supported on the lower grill element.

For purposes of storage, handling and transportation, the collapsible folding barbecue unit of this invention is capable of assuming a thin, compact form with the grill elements enclosed therein in such manner as to prevent contamination of other camping equipment in the event the grills are coated with grease, ashes, etc.

Each of the grills typically incorporate a rectangular framework to which is secured a grillwork formed by expanded metal, interlaced wire members, etc. The grill members incorporate handle structures which are selectively positionable in the grill positioning slots to thus secure the grills against movement while the cooking unit is being used. The grill handle structures may be manipulated manually even during use, thereby providing the user with the capability of changing the spacing of the grills as is appropriate to achieve the cooking characteristics that are desired.

During storage, the upstanding side wall and rear wall portions of the base structure cooperate with a flat base plate to define a generally rectangular receptacle that is of minimal dimension to receive only the stacked grills. The grill elements are receivable in side-by-side, engaging or stacked relation within the thin storage receptacle. The rear wall and side wall portions of the cooking unit are then folded to overlapping relation to cooperatively define a protective closure to secure the grill devices within the storage receptacle of the closed cooking unit to thus protect other equipment against possible contamination if the grills are dirty. When folded, cooking unit is quite thin, the thickness being approximately that of the base plate, grill elements and overlapping wall structures. It is quite compact when so folded, thus promoting its efficient handling and transportation, such as in connection with outdoor activities. During handling, the handles of the grill elements extend from the collapsed and folded barbecue cooking unit, thereby providing efficient means for manual carrying of the unit by simply grasping the grill handles. Also, the rear wall flange of the cooking unit may be provided with a handle to enable carrying of the cooking unit with the open front side facing downwardly. This feature permits efficient controlled removal of ashes and other debris without the possibility that the user might get dirty in doing so.

BRIEF DESCRIPTION OF THE DRAWINGS

So that the manner in which the above-recited features, advantages and objects of the present invention, as well as others will become apparent, are attained and can be understood in detail, a more particular description of the invention, briefly summarized above, may be had by reference to the embodiment thereof which is illustrated in the appended drawings, which drawings form a part of this specification.

It is to be noted, however, that the appended drawings illustrate only typical embodiments of this invention and are not to be considered limiting of its scope, for the invention may admit to other equally effective embodiments.

IN THE DRAWINGS

Figure 1:
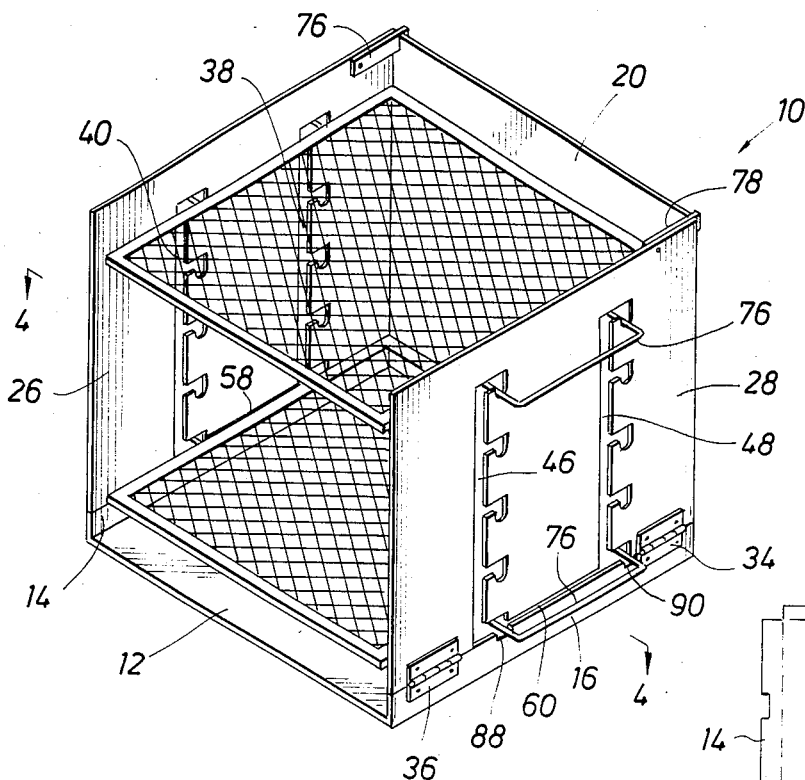

FIG. 1 is an isometric illustration of a collapsible, folding barbecue cooking unit constructed in accordance with the present invention and being shown in position for cooking activities.

Figure 2:
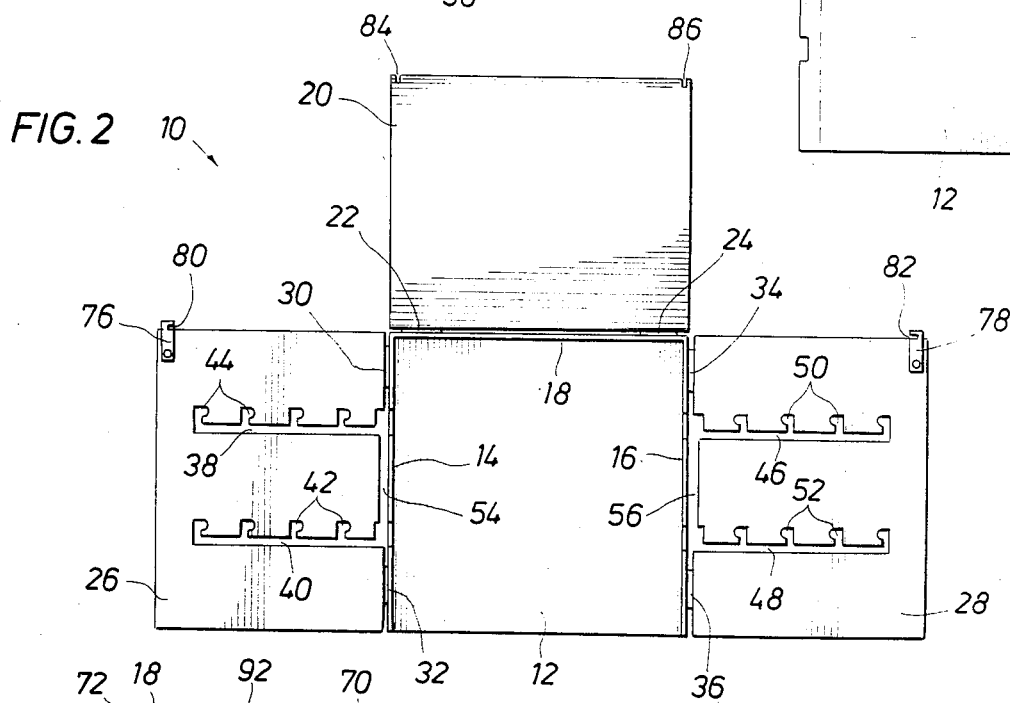

FIG. 2 is a plan view of the barbecue cooking unit of FIG. 1 with the side wall and rear wall folded outwardly to essentially parallel relation with the base plate to illustrate the relationship of the connected parts.

Figure 3:
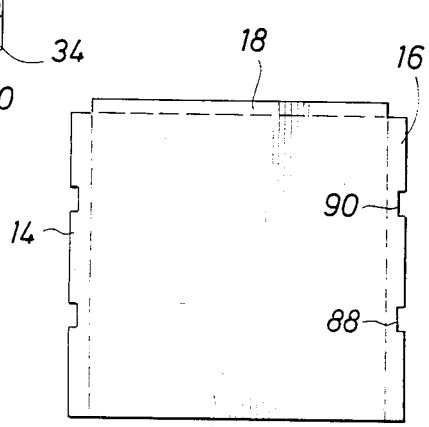

FIG. 3 is a plan view of a base sheet blank showing broken folded lines to illustrate formation of the base strucure of the cooking unit.

Figure 4:
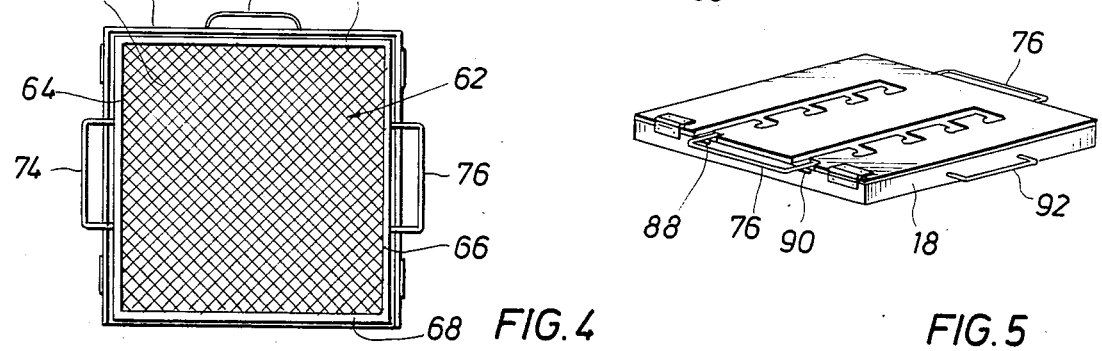

FIG. 4 is a transverse sectional view in plan showing one of the grill elements in assembly with the cooking unit.

Figure 5:
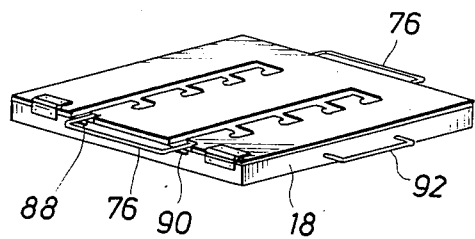

FIG. 5 is an illustration showing the collapsed and folded condition of the cooking unit of FIGS. 1 and 2 with the various parts thereof being arranged for storage and handling.

DETAILED DESCRIPTION OF PREFERRED EMBODIMENT

Referring now to the drawings and first to FIGS. 1 and 2, a collapsible, folding barbecue unit is illustrated generally at 10 having a base structure incorporating base plate 12 in the form of a generally rectangular panel of sheet metal. The base structure includes upstanding side wall flanges 14 and 16 and an upstanding rear wall flange 18. The flanges 14, 16 and 18 are formed integrally with the base plate 12 and are provided by bending portions of a sheet blank along broken fold lines as shown in FIG. 3. It should be noted that the side flanges 14 and 16 extend upwardly to a greater extent as compared with rear flange 18. For example, in a grill structure having a base plate dimension of about 13 inches from side to side, the side flanges 14 and 16 may be in the order of 1½ inches high while the rear flange 18 may be in the order of 1 inch in height.

To the upstanding rear wall flange 18, a rear wall panel 20 is secured by hinge members 22 and 24 which are affixed to the respective outer wall surfaces. From the standpoint of dimension, the rear wall panel 20 may be in the order of 11 inches in height for a folding barbecue unit of the dimension set forth above.

To the side flanges 14 and 16 are connected side wall panel structures 26 and 28, respectively. Side wall panel 26 is secured to the upstanding wall flange 14 by hinge members 30 and 32, while side wall panel 28 is secured to the upstanding side wall flange 16 by hinge members 34 and 36. Again, the hinge members 30, 32, 34 and 36 are secured to the outer wall panel structures as is evident from FIG. 1. Alternatively, the side wall panels 26 and 28 and the rear wall panel 20 may be provided with any other suitable hinged connection other than the hinge members shown, it only being appropriate that the rear wall and side wall panels be capable of folding outwardly to the position shown in FIG. 2 or inwardly to the folded position shown in FIG. 5 thus requiring pivotal movement of at least 180° about the hinge connection.

For purposes of grill positioning, side wall panel 26 defines elongated vertical parallel slots 38 and 40 from which extend transverse grill positioning slots, such as shown at 42 and 44. Likewise, the opposite side wall plate 28 defines elongated parallel slots 46 and 48 from which extend transverse grill positioning slots 50 and 52. In the upstanding position of the side walls, the lower central edge portions 54 and 56, respectively, are disposed in spaced relation with the upper extremities of the upstanding side wall flanges 14 and 16, thereby defining generally horizontal handle receiving slots at each side thereof as shown at 58 and 60.

As shown in FIG. 4, a pair of grill members are provided as shown generally at 62, which may be of generally identical construction, if desired. It should be borne in mind that the lower grill member is intended to support the fuel for cooking, which may conveniently take the form of charcoal briquets, charcoal, wood, etc. The upper grill member will provide support for the food product being cooked and, if desired, may be composed of a different material, such as stainless steel, chromed steel, etc., so as not to contaminate the food product. The lower grill element will be subject to considerably greater heat as compared to the upper grill element, thus perhaps requiring different construction materials. For purposes of this invention, however, the grill elements will be considered essentially of the same construction. In the preferred embodiment a grill framework is provided including side structural members 64 and 66 which are interconnected in any suitable fashion with structural members 68 and 70. It is to be understood that a rectangular grill may be provided, such as by expanded metal, which has no peripheral framework. A grill panel 72 in the form of expanded metal, interwoven wire members or the like, are secured at the edge portions thereof to the grill framework. This connection may be established by means of spot welding or by any other suitable form of connection. Handle members 74 and 76 are connected to the side portions 64 and 66 such as by welding or by any other form of connection, such that the handles are essentially rigid with respect to the framework. The handles include parallel portions which extend through the parallel vertical slots and are received by the transverse grill positioning slots for positioning of the grills. By appropriate manipulation, the handle members 74 and 76 may be extended through the respective side wall slots 58 and 60 such that the handles enter the elongated slots of the side walls. Thereafter, the handle members are moved upwardly to a sufficient distance above the base plate panel 12 for desired cooking operations. The handles are then moved transversely into the transverse slots, as desired, and are lowered into the appropriate rounded slot portions of the transverse slots. The handle members, being essentially rigid with respect to the grill framework, will provide efficient support for the grill members during cooking operations.

To secure the side walls and rear wall in upstanding position, the side wall panels 26 and 28 are provided with pivoted lock members 76 and 78 which define terminal slots 80 and 86, respectively, that are received by slots 84 and 86 defined in the upper portion of the rear wall. The slots of the lock members and the rear wall panel are brought into interengaging assembly to thereby positively secure the walls in integral assembly to form the wall structure of the cooking unit.

The cooking unit of FIG. 1 is capable of being folded to the flat, compact condition shown in FIG. 5 without requiring disassembly of the grill elements from the cooking unit. To accomplish folding, the handle members 74 and 76 of the grill members are lifted slightly and shifted transversely into alignment with the respective pairs of vertical slots. First, the lower grill member is manipulated in this fashion and is lowered into the rectangular storage receptacle defined by the upstanding side flanges 14 and 16 and the upstanding rear flange 18. This storage chamber is of sufficient depth only to receive both the upper and lower grill member stacked relation therein. After the lower grill has been lowered into the storage receptacle, the upper grill member is manipulated in likewise fashion, moving its handles into the vertical slots and then lowering it into engaged stacked relation with the lower grill member. This movement places the respective grill handles into juxta-position, with the handles extending transversely from the folded grill unit. After the grill elements have been lowered into the storage receptacle, the latch members 76 and 78 are pivoted to release the connection of the side walls with the rear wall panel. Thereafter, the rear wall panel 20 being connected to the upstanding flange 18 of less height as compared to flanges 14 and 16, is folded downwardly into engaging relation with the uppermost one of the grill members. Thereafter, the side wall panels 26 and 28 are folded over the rear wall panel 20 and are brought into overlapping relation. The side wall panels and the rear wall panel cooperate to define a protective closure for the storage receptacle. After the panels have been so folded, the barbecue cooking unit will assume the condition shown in FIG. 5. It may then be grasped by the handles and manually transported, as desired. Since the grill members 62 are enclosed protectively within the storage receptacle, any contaminants thereon, such as grease, dirt, ashes, etc., will be protectively enclosed within the storage receptacle. They cannot come into contact with other equipment that might be utilized during recreational activities.

To permit the grill handle structures 74 and 76 sufficient downward movement so as to position the grill members 62 into the storage receptacle, the upstanding side wall flanges 14 and 16 define handle slots such as shown at 88 and 90. A single handle element 92 may be secured to the upstanding rear wall flange 18, as shown in FIG. 5.

During use of the collapsible folding barbecue cooking unit of this invention, it may be transported in folded condition as shown in FIG. 5. The extending handles 74 and 76 of the grill elements may be used as the handles of the device, if desired, or a separate handle may be used, such as shown at 92, connected to the upstanding rear wall flange 18. Since the front of the base structure is open, the handle 92 may be lifted to pour ashes and other debris from the closed cooking unit into an appropriate refuse receptacle. With the unit positioned with the base plate panel 12 resting on any suitable support such as the ground, a heat resistant platform, etc., the side wall panels 26 and 28 may be unfolded to the positions shown in FIG. 2. Thereafter, the rear wall panel 20 may be unfolded and each of the three panels may be positioned in upright manner and the latch members 76 manipulated to enter the latch slots 84 and 86 of the rear panel, thereby securing all of the wall panels in assembly. Thereafter, the handles 74 and 76 of the upper grill elements 62 will be grasped and moved upwardly in the vertical slots of the side wall panels to the appropriate height for cooking. For maximum height, the handles will be moved to the positions shown in FIG. 1, thereby positioning the upper grill member at its uppermost position relative to the wall structures. Thereafter, the handle of the lower grill element 62 will be manipulated upwardly in the vertical slots of the side walls to the appropriate position shown. The handles may rest on the upper end portions of the upstanding side wall flanges, is desired, or, may be moved to any of the transverse slots below the upper grill member. Set up time for the average person requires only from about a half minute to a minute or two. Thereafter, fuel may be located on the lowermost grill member and may be ignited, thereby providing heat and radiation for cooking of food products supported on the upper grill member. After cooking operations have begun, it is possible to grasp the handle members of the lower grill member or upper grill member and appropriately adjust the position of them within the cooking chamber defined by the side walls and rear wall. Slow cooking may be accomplished for a particular period of time, as desired, and, then for rapid charbroiling type cooking, the relative spacing of the grill members may be appropriately adjusted. After cooking operations have ceased, the barbecue cooking unit may be lifted at its rear portion by handle 92, perhaps by manipulation of the grill handle members to thus pour charcoal or other fuel from the open front of the grill structure into an appropriate refuse receptacle. The grills may be then lowered into the storage receptacle and the side walls and rear wall folded to the position shown in FIG. 5.

In view of the foregoing, it is clearly evident that the present invention is one well adapted to attain all of the objects and advantages hereinabove set forth, together with other objects and advantages that are inherent from a description of the apparatus itself.

It will be understood that certain combinations and subcombinations are of utility and may be employed without reference to other features and subcombinations. This is contemplated by and is within the scope of the present invention.

As many possible embodiments may be made of this invention without departing from the spirit and scope thereof, it is to be understood that all matters hereinabove set forth or shown in the accompanying drawings are to be interpreted as illustrative and not in any limiting sense.

What is claimed is:

1. A collapsible folding barbecue cooking unit, comprising:
   (a) generally rectangular base means defining opposed side means and back means and a bottom means;

(b) a pair of side plates and a back plate being hingedly connected to respective opposite side means and said back means of said base means, said side plates having grill positioning means therein and said side plates and back plate being positionable in upright, substantially normal relation with said bottom means during use and being positionable in folded overlapping relation and substantially parallel with said bottom means for storage, said side plates and back plate, when folded for storage, cooperate with said base means to define a generally rectangular grill receptacle;

(c) an upper generally rectangular grill element for support of food products to be cooked;

(d) a lower generally rectangular grill element for support of solid fuel, said upper and lower grill elements substantially filling said generally rectangular grill receptacle when folded for storage when placed in engaging stacked relation therein; and (e) handle means extending from opposed sides of each of said upper and lower grill elements, said handle means extending through and engaging said grill positioning means for selective positioning of said upper and lower grill elements relative to said base means, said handle means extending from said generally rectangular grill receptacle in the folded condition thus permitting carrying of the folded barbecue unit.

2. A collapsible folding barbecue unit as recited in claim 1, wherein said base means includes:

(a) a generally rectangular plate member formed of sheet metal; forming said bottom means (b) opposed side flanges and a back flange extending upwardly from said generally rectangular plate member; and (c) said side plates and back plate being hingedly connected to respective side flanges and said back flange.

3. A collapsible folding barbecue unit as recited in claim 2, wherein:

said side plates and said back plate are pivotal at least 180° relative to said side flanges and said back flange.

4. A collapsible folding barbecue unit as recited in claim 2, wherein:

said side flanges and said rear flange are integral with said generally rectangular plate member, being formed from a common blank of sheet metal.

5. A collapsible folding barbecue unit as recited in claim 1, wherein said grill positioning means comprises:

(a) elongated, generally parallel handle slots being formed by each of said side plates and being disposed in generally vertical orientation when said side plates are in upright position for use;

(b) spaced transverse slot portions being defined by said side plates in intersecting relation with said generally parallel handle slots and each defining handle receptacle portions; and (c) said handle means of said upper and lower grill elements extending through said handle slot means and being exposed externally of said side plates for manual movement of said upper and lower grill elements to selected transverse slot portions for selected grill elevation, said handle receptacle portions receiving said handle means and thereby securing said grill elements at the selected elevation.

6. A collapsible folding barbecue unit as recited in claim 5, wherein:

said side plates define lower edges spaced from said side flanges and defining handle slots through which said handle means of said upper and lower grill elements are inserted.

7. A collapsible folding barbecue unit as recited in claim 2, wherein:

(a) said side flanges and said back flange cooperate with said generally rectangular plate member to form a grill storage compartment;

(b) said upper and lower grill elements are positionable within said grill storage compartment; and (c) said side plates and said rear plate are pivotal to overlapping relation forming a closure for said grill storage compartment.

8. A collapsible folding barbecue unit as recited in claim 7, wherein:

said side flanges each define handle slots receiving said handle means of said upper and lower grill elements when said upper and lower grill elements are located within said grill storage compartment.

9. A collapsible folding barbecue unit as recited in claim 2, wherein:

said back flange is of less height in comparison with said side flanges, in the folded condition of said cooking unit said back plate engaging said upper grill element and said side plates being pivoted to overlapping relation with one another and with said back plate.

10. A collapsible folding barbecue unit as recited in claim 1, wherein:

latch means establishes interlocking relation between said side plates and said back plate, securing all of said plates in substantially upright position for use of said cooking unit.

11. A collapsible folding barbecue unit as recited in claim 10, wherein said latch means comprises:

(a) latch elements being pivotally connected to side plates and defining latch slots;

(b) latch receptacle slots being defined by said back plate and receiving said latch elements in interengaging relation to releasably secure said back plate to said side plates.

12. A collapsible folding barbecue unit as recited in claim 1, wherein said upper and lower grill elements are substantially identical and comprise:

(a) a generally rectangular grill framework of slightly smaller dimension than the dimension of said base means;

(b) generally rectangular grill-work means being secured at the peripheral portion thereof to said generally rectangular grill framework; and (c) said handle means comprise a pair of generally U-shaped handle elements being fixed to opposite sides of said generally rectangular grill framework, said U-shape of said handle elements being defined by generally straight parallel handle sections capable of extending through said engaging grill positioning means to releasably secure said grill elements at a preselected height relative to said base means.

13. A collapsible folding barbecue unit, comprising:

(a) a generally rectangular base element having a flat bottom plate and upstanding side and back wall flanges cooperating to define a thin generally rectangular grill storage receptacle;

(b) a pair of side plates and a back plate being respectively hingedly connected to said side flanges and said back flange, said side plates and back plate being pivotal to an overlapping relation forming a protective closure for said grill storage receptacle;

(c) latch means releasably securing said side plates to said back plate in the upstanding positions thereof to form a generally rectangular cooking enclosure;

(d) said side plates having generally parallel handle slots and transverse grill positioning slots intersecting said handle slots formed therein; and (e) upper and lower generally rectangular grill elements of a combined vertical dimension for substantially filling said generally rectangular grill storage receptacle in a collapsed condition, said grill elements each having handle elements fixed thereto which are extendable through said handle slots and are engageable with selected ones of said transverse grill positioning slots, said handle elements extending outwardly of said side plates for manual manipulation, said handle elements extending from said generally rectangular grill receptacle in the collapsed and folded condition of said barbecue cooking unit.

14. A collapsible folding barbecue unit as recited in claim 13, wherein:

said back flange is of less height in comparison with said side flanges, in the folded condition of said cooking unit said back plate engaging said upper grill element and said side plates being pivoted to overlapping relation with one another and with said back plate.

15. A collapsible folding barbecue unit as recited in claim 13, wherein said latch means comprises:

latch receptacle slots being defined by said back plate and receiving said latch elements in interengaging relation to releasably secure said back plate to said side plates.

16. A collapsible folding barbecue unit as recited in claim 13, wherein said upper and lower grill elements comprise:

said handle means comprise a pair of generally U-shaped handle elements being fixed to opposite sides of said generally rectangular grill framework, said U-shape of said handle elements being defined by generally straight parallel handle sections capable of extending through said engaging grill positioning means to releasably secure said grill elements at a preselected height relative to said base means.

* * * * *